United States Patent [19]

Casavant et al.

[11] Patent Number: 5,317,398

[45] Date of Patent: May 31, 1994

[54] VIDEO/FILM-MODE (3:2 PULLDOWN) DETECTOR USING PATTERNS OF TWO-FIELD DIFFERENCES

[75] Inventors: Scott D. Casavant, East Windsor; Robert N. Hurst, Jr., Hopewell; Stuart S. Perlman, Princeton; Michael A. Isnardi, Plainsboro, all of N.J.; Felix Aschwanden, Thalwil, Switzerland

[73] Assignee: RCA Thomson Licensing Corporation, Princeton, N.J.

[21] Appl. No.: 930,257

[22] Filed: Aug. 17, 1992

[51] Int. Cl.$^5$ .............................................. H04N 5/14
[52] U.S. Cl. ...................... 348/570; 348/441; 348/97; 348/607; 348/700
[58] Field of Search ................... 358/160, 97, 140, 139, 358/214, 54, 166, 105, 167, 36, 37; H04N 5/14

[56] References Cited

U.S. PATENT DOCUMENTS

| | | | |
|---|---|---|---|
| 4,703,358 | 10/1987 | Flannaghan | 358/167 |
| 5,111,511 | 5/1992 | Ishii | 358/105 |
| 5,191,427 | 3/1993 | Richards | 358/214 |

Primary Examiner—James J. Groody
Assistant Examiner—Sherrie Hsia
Attorney, Agent, or Firm—Joseph S. Tripoli; Eric P. Herrmann; Ronald H. Kurdyla

[57] ABSTRACT

A film/video detector includes circuitry for generating the differences between corresponding pixel values in successive frames of video signal. These differences are accumulated over respective frame intervals. Accumulated values for respective frames are applied to a signal averager and to a correlation circuit. Average values from the averager are subtracted from correlation values from the correlation circuit, and film mode signal is indicated if the latter differences are greater than a predetermined value.

16 Claims, 5 Drawing Sheets

VIDEO/FILM-MODE (3:2 PULLDOWN) DETECTOR USING PATTERNS OF TWO-FIELD DIFFERENCES

This invention relates to apparatus for detecting whether a video signal originated from video processing, e.g., video cameras, or from moving picture film. Herein after the detector will be designated "film/video detector".

BACKGROUND OF THE INVENTION

Source material shot on film at 24 frames per second is translated to video (at 30 frames per second) by a process known as 3:2 pulldown. In this process every other film frame is converted to three interlaced video fields. The intervening film frames are converted to two interlaced video fields. FIG. 1A illustrates video signal originated via video processing. Each box represents a video frame. Each column of circles represents a field. Successive columns of circles represent interlaced video fields. FIG. 1B illustrates video signal originated via the 3:2 pulldown process. Each box represents a film frame of source material. For every other film frame three video fields are generated, two of which contain identical information, for example fields A and C in frame 1 are identical and fields F and H of frame 3 are identical. Being able to determine whether video material is derived via 3:2 pulldown or video processing can be used to advantage in many video signal processing systems such as IDTV receivers or digital video compression systems.

Consider video signal compression. Video signal originated from film includes one redundant field in every five fields, or a 20 percent redundancy. If the video signal can be determined as having originated in film mode, it is possible to delete the redundant fields in the compression process to achieve an 20 percent compression bonus. FIG. 1C illustrates the formation of frames of interlaced video for compression according to the MPEG (Moving Pictures Expert Group of the International Standards Organization) protocol. FIG. 1D illustrates the formation of frames of interlaced film mode video for MPEG compression wherein it may be seen that redundant fields may be excised.

SUMMARY OF THE INVENTION

The present invention is a film/video detector including first circuitry for generating the differences between corresponding pixel values in successive frames of video signal. These differences are accumulated over respective frame intervals. Accumulated values for respective frames are applied to a signal averager and to a correlation circuit. Average values from the averager are subtracted from correlation values from the correlation circuit, and film mode signal is indicated if the latter differences are greater than a predetermined value.

DETAILED DESCRIPTION

Figure 1A:
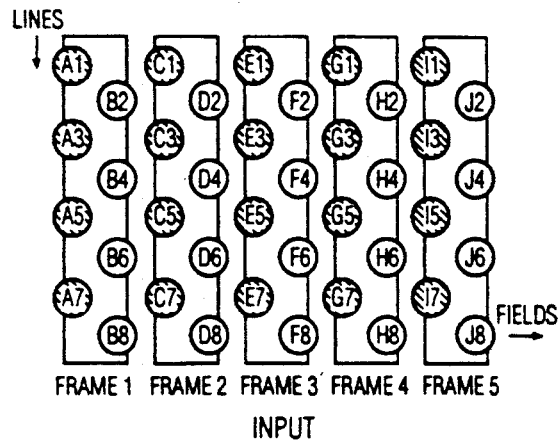
FIGS. 1A-1D are pictorial illustrations of fields/frames of video signal useful in describing the invention.
Figure 1B:
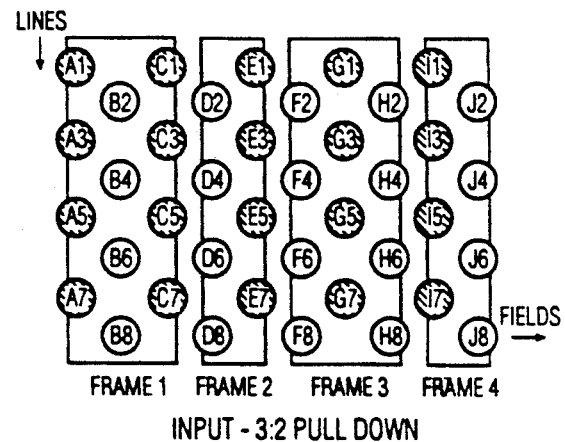
Figure 1C:
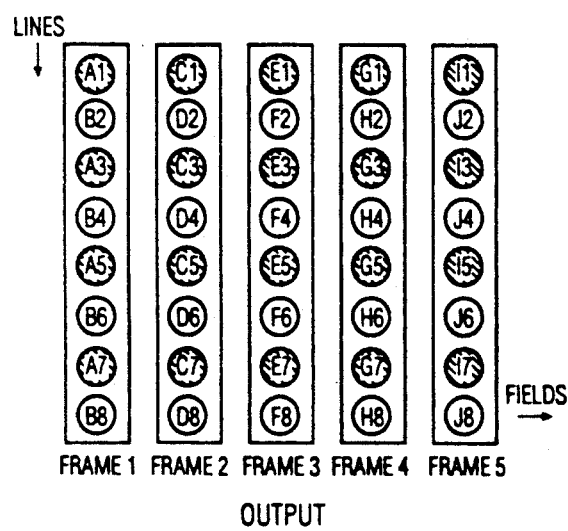
Figure 1D:
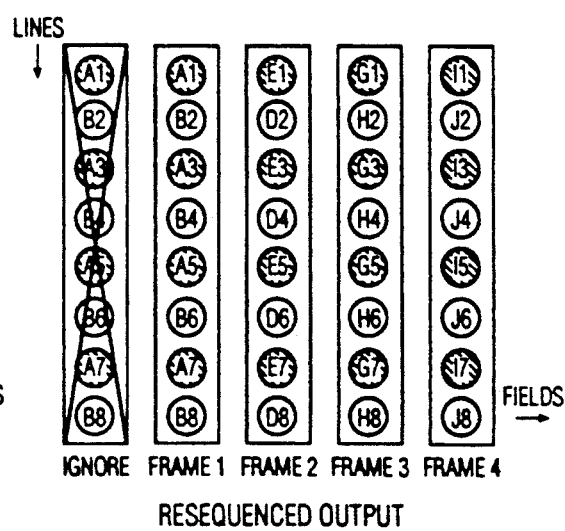
Figure 2:
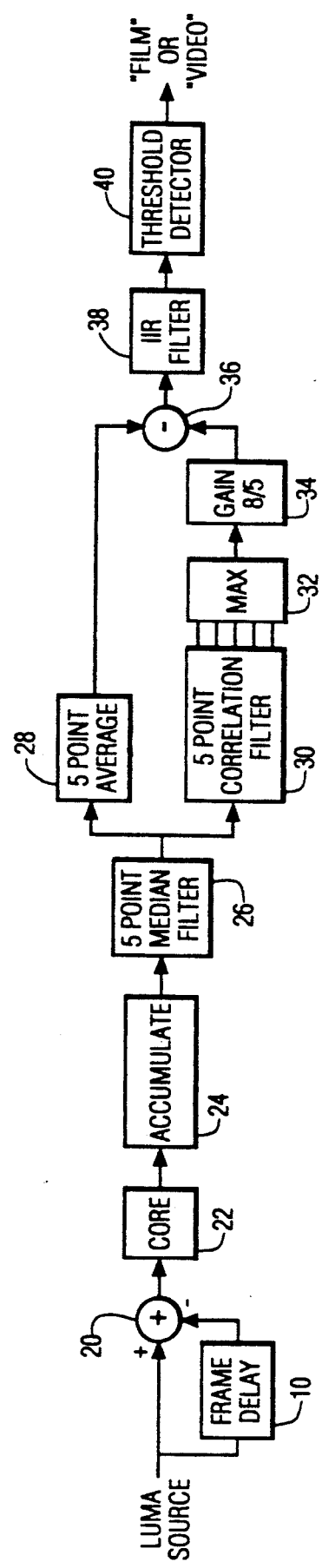
FIG. 2 is a block diagram of a digital film/video detector embodying the invention.

The purpose of the film mode detector is to differentiate between material produced directly as video (at 30 frames per second) and material originally shot on film (at 24 frames per second) and then translated to video using a telecine with 3:2 pulldown. When 3:2 pulldown is present, one in five video fields $f_n(i,j)$ contains the same image information as the one two fields before it $f_{n-2}(i,j)$, (i and j are the horizontal and vertical coordinates of the image). FIG. 2 shows a block diagram of an exemplary 3:2 pulldown detector according to the present invention. In FIG. 2, an input luminance signal is applied to a delay element 10 which delays the luminance by a period equal to two field intervals. If the current input signal represents field $f_n(i,j)$, the delay element 10 provides signal representing field $f_{n-2}(i,j)$ at its output connection. Delayed and non-delayed signal are applied to a subtracter 20 which generates the differences of corresponding pixels in successive frames, i.e., between two fields separated by a field. The differences are represented by:

$$d_n(i,j) = f_n(i,j) - f_{n-2}(i,j)$$

Figures 5A, 5B:
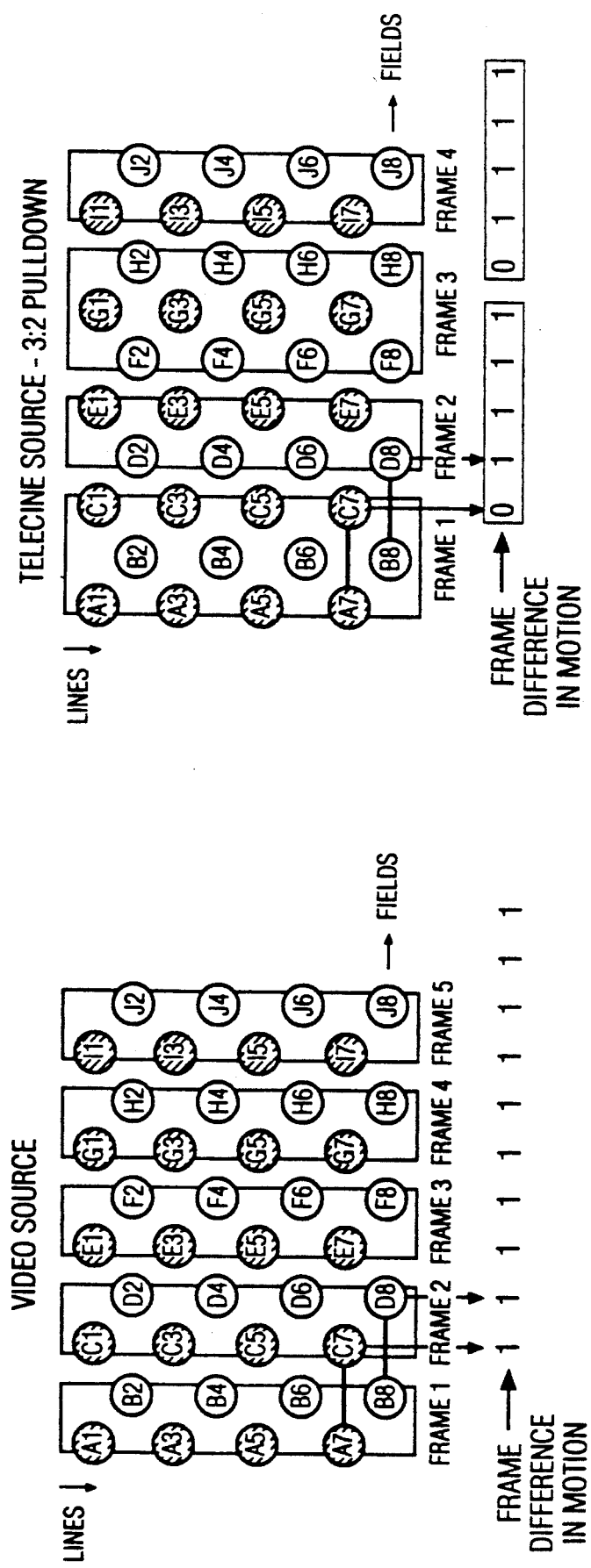
FIGS. 5A and 5B are pictorial diagrams illustrating the correspondence between film/video detection and respective redundant fields.

Ignoring noise for the moment, any parts of the image which are identical in both fields result in a zero frame difference. If 3:2 pulldown is present, then one out of every five fields will contain the same information as one that came two fields before it, i.e., $(f_n(i,j) = f_{n-2}(i,j))$. This is illustrated in FIGS. 5A and 5B. Note that in the frame difference signal, a "0" indicates $d_n(i,j)=0$ while a "1" indicates $d_n(i,j) \neq 0$. These binary values are used for illustration only. The system utilizes the actual frame difference values.

When 3:2 pulldown is present, the frame difference results in substantially an entire field of zeros in one of every five fields. Note that if there is no motion or change of illumination in the scene, every field will contain zeros whether or not 3:2 pulldown is present. This case will be addressed in greater detail later.

Because the input signal will nominally contain some noise, the difference signal is coupled to a coring circuit 22 which excises differences having values less than a predetermined amplitude. That is, small frame differences are set to zero. Coring effectively removes the possibility of noise being mistaken for image motion or image changes, and insures that only significant differences are forwarded for further processing.

The cored differences, $c_n(i, j)$ are applied to an accumulator 24 which sums the magnitudes of the cored difference signal for each field. The accumulator is reset at the beginning of each vertical interval. Concurrently with the reset operation the last-most sum of differences is latched for use in the succeeding circuitry. These sums are given by the relation:

$$S_n = \sum_i \sum_j |c_n(i,j)|.$$

This reduces a field's worth of difference values to a single value $S_n$, the magnitude of which is an indication of the degree of difference or motion between the current field and the field that occurred two fields prior.

Figure 4:
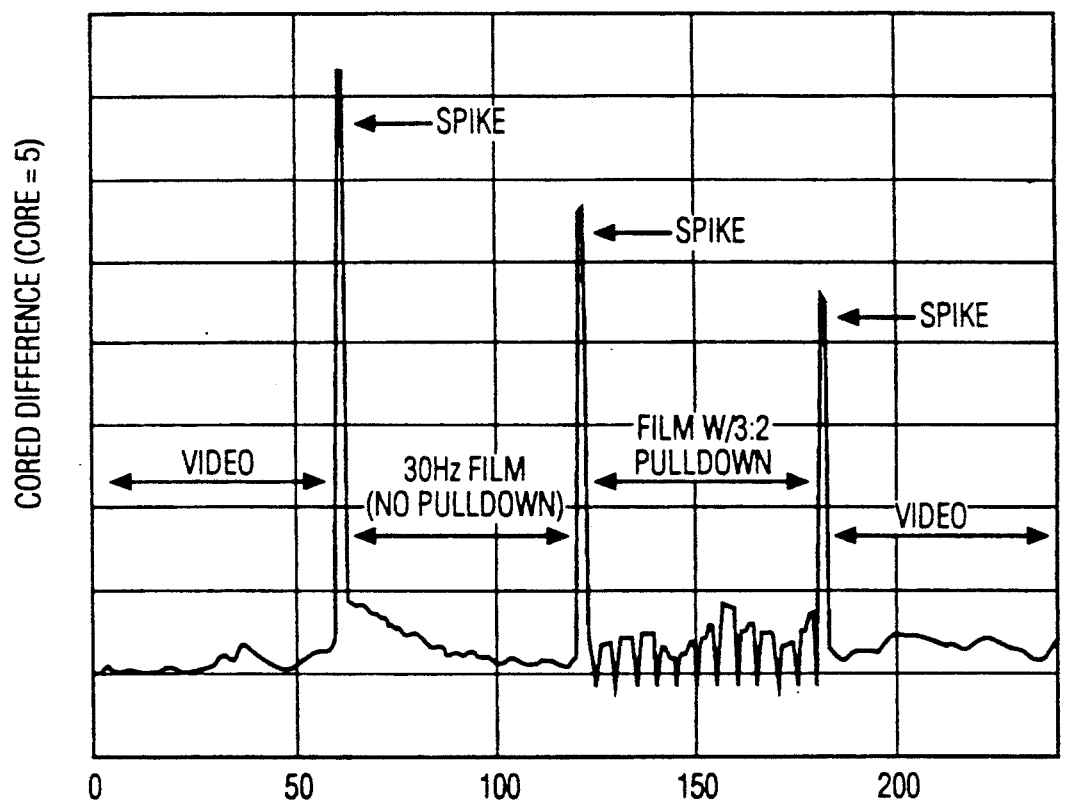
FIG. 4 is a graph of accumulated frame differences for segments of video signal originated as both video and film.

FIG. 4 shows in graphical form, the nature of accumulated frame differences for several types of moving images. The signal utilized was composed of four separate scenes, each one including 60 fields. Each scene is separated by a large, two field-wide spike in the data. This large spike is due to the scene transitions which nominally produces a very large $s_n$, as might be expected. The third scene (fields 120-180) was a commercial, shot on film and converted to video using 3:2 pulldown. The 3:2 pulldown material is seen to generate a pattern of four relatively large difference totals followed by one small one. The small one is due to the repeated field which produces a very small difference total (ideally, it should be zero).

The respective sums or frame difference totals from the accumulator are applied to a five point median filter 26. The median filter is incorporated to eliminate the large spikes at the scene transitions. The median filter performs the following function. If the current difference sum $s_n$ minus the median of $s_n$ and the last four difference sums is greater than some positive threshold or less than some negative threshold, then the current difference sum $s_n$ is replaced with the median value (that is, if $s_n$ − median $(s_n, s_{n-1}, s_{n-2}, s_{n-3}, s_{n-4}) < $ Vth, than replace $S_n$ with median $(s_n, s_{n-1}, s_{n-2}, s_{n-3}, s_{n-4})$). Otherwise, $s_n$ is passed unaltered. Separate thresholds can be set for upward spikes and downward spikes to prevent the possibility of eliminating the downward spikes caused by the 3:2 pulldown.

Sum values provided from the median filter 26 are coupled to an averager 28 and to a correlation circuit 30. The averager 28 provides the average of the current sum and the previous four sums. The average of these five sums provides an indication of the total amount of motion present in the signal. When the scene is encoded with 3:2 pulldown, one of the five sums will be very small. Therefore, the averages for 3:2 pulldown material will be about 4/5 as large as averages for video source material.

The correlation circuit 30 performs a five way correlation of the current and previous four sums. That is it calculates five sums, $CC_i$, as follows:

$$\begin{bmatrix} CC_1 \\ CC_2 \\ CC_3 \\ CC_4 \\ CC_5 \end{bmatrix} = \begin{bmatrix} -1.00 & 0.25 & 0.25 & 0.25 & 0.25 \\ 0.25 & -1.00 & 0.25 & 0.25 & 0.25 \\ 0.25 & 0.25 & -1.00 & 0.25 & 0.25 \\ 0.25 & 0.25 & 0.25 & -1.00 & 0.25 \\ 0.25 & 0.25 & 0.25 & 0.25 & -1.00 \end{bmatrix} \begin{bmatrix} S_n \\ S_n - 1 \\ S_n - 2 \\ S_n - 3 \\ S_n - 4 \end{bmatrix}$$

The above matrix equation represents five specific correlation functions applicable for processing discrete time samples. In the frequency domain the five correlation functions may be represented in generalized form by the equations;

$$H1 = A + BZ^{-1} + CZ^{-2} + DZ^{-3} + EZ^{-4}$$

$$H2 = E + AZ^{-1} + BZ^{-2} + CZ^{-3} + DZ^{-4}$$

$$H3 = D + EZ^{-1} + AZ^{-2} + BZ^{-3} + CS^{-4}$$

$$H4 = C + DZ^{-1} + EZ^{-2} + AZ^{-3} + BZ^{-4}$$

$$H5 = B + CZ^{-1} + DZ^{-2} + EZ^{-3} + AZ^{-4}$$

where the $H_i$ correspond to $CC_i$ and "Z" is the conventional Zee transform variable.

Each of the correlation values $CC_i$ are effectively filter responses with a DC response of zero. Therefore, if the source material originated via video processes, all five of the sums $S_i$ should have similar values, and each of the correlation values $CC_i$ should be relatively small. Conversely if the source material originated from 3:2 pulldown, one of the five sums will be larger than the other four, and the correlation value containing the product of (−1.0) times the small valued sum should be a number which is significantly larger than the others. This particular correlation value is determined by applying all five correlation values $CC_i$ to a maximum detector 32. In scenes with 3:2 pulldown, this correlation value represents the magnitude of the motion signal averaged over the four fields containing unique information. This correlation value is applied to a scaling circuit 34 wherein it is weighted by a factor of 4/5. The weighted value should be substantially the same as the value produced by the 5 point average generated by element 28. By subtracting these two signals, (in subtracter 36) they should cancel whenever 3:2 pulldown is present. Alternatively if the source material is video generated, the differences produced by the subtracter 36 will approximate the five point average. Thus there is a relatively large differential between the differences generated in the subtracter 36 for video source material and film source material, rendering it easy to detect source material generated via 3:2 pulldown. (Note, in an alternative embodiment, the signs (polarities) of the weighting factors of the correlation filter may be interchanged and a minimum detector substituted for the maximum detector 32. In this instance an adder will be substituted for the subtracter 36.))

If the output of the correlation filter is multiplied by a gain factor of 8/5 (twice what it was above) and subtracted from the 5 point average signal, the differences will tend to be a bipolar signal. Positive differences represent motion in video mode (no 3:2 pulldown), while any negative signal indicates that 3:2 pulldown present. This bipolar signal provides one of the unique properties of this 3:2 pulldown detector—its ability to indicate a measure of confidence that a particular signal contains 3:2 pulldown. The more negative the signal, the more likely it is that the scene was originally shot on film and converted to video using 3:2 pulldown. The more positive the signal, the more likely it is that there is no 3:2 pulldown present.

If the film/video detector is to be employed in video compression apparatus subjective experiments show that it is better to mistake film with 3:2 pulldown as video than vice-versa. To minimize the occurrence of such mistakes, an infinite impulse response (IIR) filter 38 with non-symmetric rise and fall times is included after the subtracter 36. The IIR filter is implemented as follows:

```
if     in(n) > out(n-1)
then   out(n) = in(n)*up_speed + out(n-1)*(1-up_speed)
else   out(n) = in(n)*down_speed + out(n-1)*(1-down_speed)
``` where up_speed and down_speed are scale factors which determine the speed of the positive and negative going output transitions from the filter 38. If up_speed is much larger than down_speed, it is clear that the output of the IIR filter is able to rise much quicker than it is able to fall. Therefore, if the source changes from film to video, the output of the filter is able to reflect that change relatively quickly. If, on the other hand, the source changes from video to film, it takes longer for the output to drift into the negative values, indicating film mode. This helps ensure that video is rarely encoded as film with 3:2 pulldown. For example, if the detector currently contains a negative value (film mode), it will switch to video mode faster if the next input value in(n) is a large positive number than if it is a small positive number. Exemplary values of up_speed and down_speed are 0.3 and 0.05 respectively.

The output of the IIR filter is applied to a threshold detector 40. This detector outputs a logic one value (for video mode) when the input value is greater than a predetermined value and outputs a logic zero value (for film mode with 3:2 pulldown) when the input value is less than a further predetermined value. In other words the threshold detector is provided with hysteresis. When the input falls within the hysteresis range, the output remains constant and prevents the output from flipping back and forth between modes when there is little or no motion present in the signal. The detector can therefore only switch modes when there is a measurable amount of interframe differences.

It is possible that video might be encoded as film if a still film scene were to slowly fade to a still video scene. This is acceptable, however, since the objectionable artifacts caused by improper encoding and subsequent decoding of the video as film only appear in moving portions of the image. So even in such a situation, the output would be acceptable while the scene remained still and would quickly switch over to video mode as soon as something moved in the image.

Figure 3:
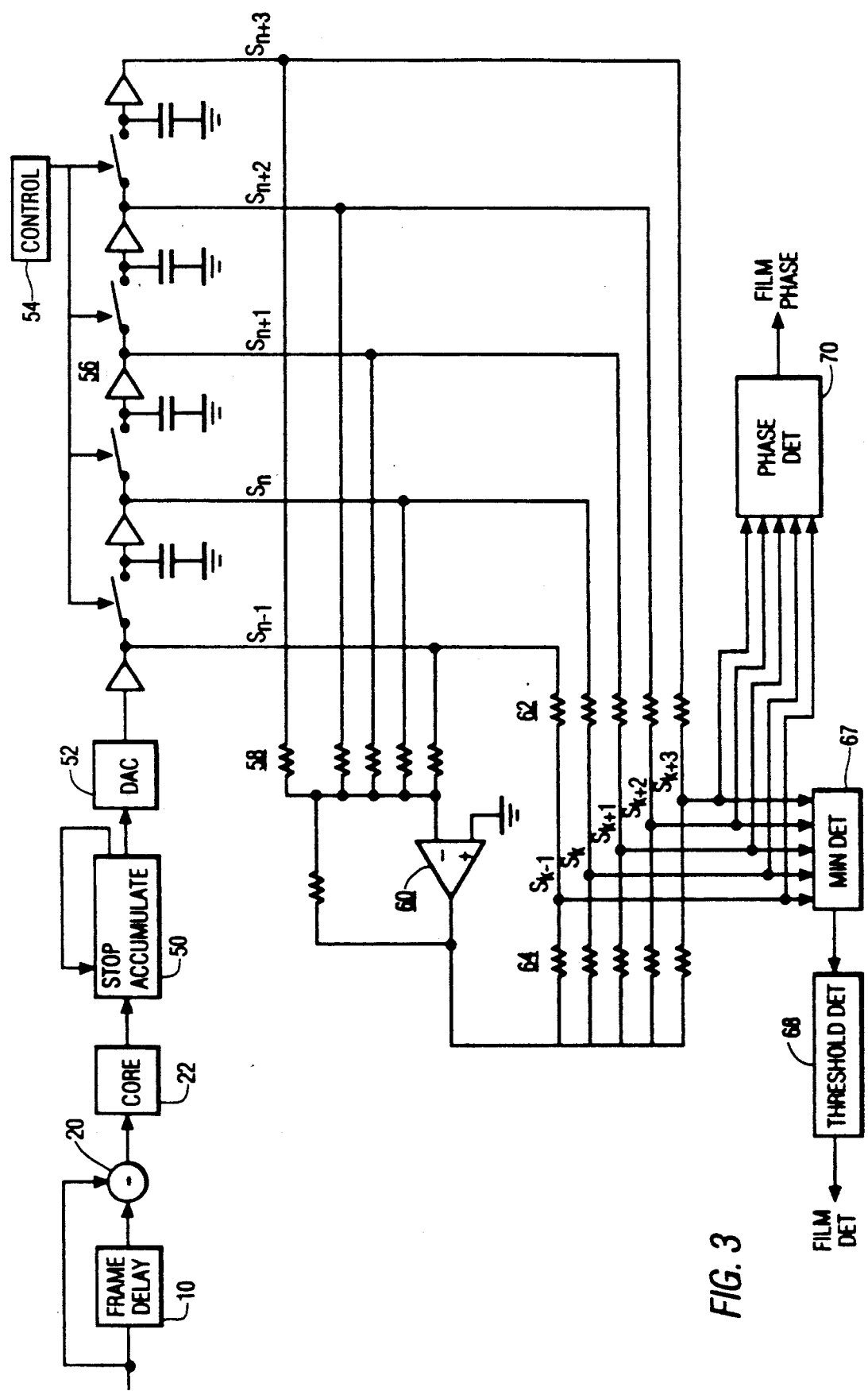
FIG. 3 is a partial block diagram-partial schematic diagram of a combined digital and analog film/video detector embodying the present invention.

FIG. 3 illustrates a second embodiment of the invention. Elements of FIG. 3 designated with the same numbers as elements of FIG. 2 are similar and perform like functions. In FIG. 3 frame differences provided by the subtractor 20 are coupled to an accumulator 50 via the coring circuit 22. The accumulator 50 is arranged to accumulate the magnitudes of the cored differences. However the accumulator 50 is also arranged to stop accumulating after it reaches a predetermined value. As such it performs a limiting function. This limiting function is provided as a substitute for the 5 point median filter 26 of FIG. 2. Experimentally it has been found that the accumulator may be arranged to limit a value of $2^{15}$ which is represented by a fifteen-bit binary signal. However, only the five most significant bits (MSB's) of this fifteen bit signal are forwarded for further processing.

Sample values represented by the five MSB's from the accumulator 50 are converted to sampled data analog form in a digital-to-analog converter 52. These sampled data analog values representing sums of differences over respective field intervals, are coupled to a sampled data analog shift register 56 which is conditioned by clocking circuitry 54 to transfer respective samples to successive stages of the register at the field rate. Respective samples are tapped from the register 56 via a bank of resistors 58, which in conjunction with an amplifier 60, generate running negative sums $S_i$ of five successive samples. These negative sums are scaled by a factor of 1/5 by virtue of feedback applied around the amplifier 60. The respective samples resident in the analog shift register are tapped by a second bank of resistors 62. The tapped values are respectively combined with the scaled negative sums $(-S_i/5)$ via a third bank of resistors 64 respectively coupled between the output of the amplifier 60 and respective ones of the resistors in the bank 62, generating five sums $S_k$. If the signal is video mode, each tapped value will equal some nominal value and the output of the amplifier will approximate this nominal value. As such each of the sums $S_k$ will be substantially equal to zero. Alternatively, if the source signal is film mode one of the five samples in the analog shift register will be substantially equal to zero while the remaining will equal the nominal value. In this instance the output of the amplifier 60 will approximate 4/5 of the nominal value. Four of the sums $S_k$ will be approximately equal to 1/5 the nominal value, and the fifth (corresponding to the duplicate 3:2 pulldown field) will be approximately equal $-4/5$ the nominal value. The five values $S_k$ are applied to a minimum detector, 67, which outputs the lowest valued one of each successive set of five values $S_k$. This value is thereafter applied to a threshold detector 68. If the magnitude of the value $S_k$, applied to the threshold detector, exceeds a predetermined threshold value, the detector 68 outputs a logic one indicating that the source signal originated from film.

Some applications not only require knowledge that the source material is film mode, but also requires knowledge of the particular field that is the duplicate field. This feature may be determined by examination of the five samples in the analog shift register or of the five sums $S_k$. If one (e.g., $S_m$) of the five sums $S_k$ is a minimum and the remaining four sums exceed a predetermined value, such as 4 times $S_m$, then the sample corresponding to $S_m$ represents the duplicate field, or the 3:2 pull-down phase.

What is claimed is:
1. A film/video detector comprising:
    a source of video signal;
    a delay device having an input connection to said source and an output connection for providing video signal delayed by a period substantially equal to two field intervals;
    signal differencing apparatus having respective input terminals coupled to said source and the output connection of the delay device for generating a signal representing the differences between corresponding image points of said video signal and said delayed video signal;
    an accumulator coupled to receive said signal representing the differences between corresponding image points for generating a signal representing accumulated said differences over respective field intervals;
    means for generating a signal representing an average of said accumulated said differences;
    a correlator, responsive to said signal representing accumulated said differences, for generating a further signal representing the smallest of accumu- lated said differences from five successive field intervals;

a signal combiner coupled to said correlator and said means for generating a signal representing an average, for combining said signal representing an average and said further signal representing the smallest accumulated said differences to produce a combined signal; and a threshold device coupled to said signal combiner for producing a film/video detection signal having first and second states for said combined signal being respectively greater and lesser than a predetermined value.

2. The film/video detector set forth in claim 1 wherein said correlator, comprises:

means for generating five filter functions H(z) according to the equations;

$$H1 = A + BZ^{-1} + CZ^{-2} + DZ^{-3} + EZ^{-4}$$

$$H2 = E + AZ^{-1} + BZ^{-2} + CZ^{-3} + DZ^{-4}$$

$$H3 = D + EZ^{-1} + AZ^{-2} + BZ^{-3} + CZ^{-4}$$

$$H4 = C + DZ^{-1} + EZ^{-2} + AZ^{-3} + BZ^{-4}$$

$$H5 = B + CZ^{-1} + DZ^{-2} + EZ^{-3} + AZ^{-4}$$

where factors A, B, C, D, E are predetermined weighting factors, Z is a conventional Zee transform variable, and superscripts associated therewith represent delay intervals in units of field periods.

3. The film/video detector set forth in claim 2 wherein said correlator further comprises:

a detector for detecting one of a maximum and minimum of values Hi set forth in claim 2.

4. The film/video detector set forth in claim 3 further comprising:

signal weighting circuitry, coupled between said correlator and said signal combiner.

5. The film/video detector set forth in claim 1 wherein said threshold device is coupled to said signal combiner via a filter having non-symmetrical responses to positive and negative transitions.

6. The film/video detector set forth in claim 1 further including coring circuitry coupled between said signal differencing apparatus and said accumulator.

7. The film/video detector set forth in claim 1 further including median filter means coupled between said accumulator and said means for generating a signal representing an average, said median filter means arranged for excising large excursions in signal applied thereto.

8. The film/video detector set forth in claim 7 further including coring circuitry coupled between said signal differencing apparatus and said accumulator.

9. The film/video detector set forth in claim 1 wherein said accumulator is arranged to stop accumulating after reaching a predetermined accumulated value for respective field intervals.

10. A film/video detector comprising:

means for applying a video signal and said video signal delayed by two field periods;

means for generating differences between corresponding image points of said video signal and said delayed video signal;

an accumulator for accumulating said differences over respective field periods to generate a signal representing accumulated values;

a tapped analog shift register coupled to said accumulator and arranged for concurrently providing accumulated values from five fields;

a first plurality of resistors having first terminals coupled to a signal summing node and respective second terminals coupled to respective taps of said analog shift register;

a second plurality of resistors having respective first terminals coupled to respective taps of said analog shift register, and having respective second terminals;

a third plurality of resistors having respective first terminals coupled to said signal summing node and having respective second terminals;

a signal combiner for coupling respective second terminals of said second and third pluralities of resistors; and a correlator coupled to said signal combiner for generating a further signal representing one of maximum and minimum accumulated value of five successive accumulated values.

11. The film/video detector set forth in claim 10 further including:

threshold detecting means coupled to said correlator, for providing a signal exhibiting a first state if said one of the maximum and minimum accumulated values exceeds a predetermined value and exhibiting a second state otherwise.

12. The film/video detector set forth in claim 10 further including coring means coupled between means for generating differences and said accumulator.

13. The film/video detector set forth in claim 1 wherein said signal combiner is a subtracter.

14. A film/video detector comprising:

a source of a video signal;

signal delay apparatus coupled to said source for providing said video signal delayed by two field periods;

signal differencing apparatus coupled to said source and said signal delay apparatus for generating differences between corresponding image points of said video signal and said delayed video signal;

an accumulator for accumulating said differences over respective field periods to generate accumulated values;

detection apparatus, including a correlator, coupled to said accumulator, for evaluating accumulated values in successive five field groupings and generating a detection signal indicative of film source material when an accumulated value is significantly different than an average of a plurality of accumulated values.

15. A film/video detector comprising:

a source of a video signal;

a frame delay for providing said video signal delayed by one frame interval;

a subtracter for providing respective interframe differences of pixels of said video signal and corresponding pixels of delayed video signal;

an accumulator, for accumulating sums of interframe differences over respective field intervals; and means responsive to accumulated sums for determining an N (an integer) field pattern of accumulated sums wherein N−1 successive fields exhibit accumulated sums of average value and an Nth field which exhibits an accumulated sum significantly different from said average value, and providing a film/video detection signal exhibiting a first state when said N field pattern occurs and a second state otherwise.

16. The detector set forth in claim 15 wherein N is equal to five.

* * * * *